United States Patent
Perley et al.

(10) Patent No.: US 9,366,230 B2
(45) Date of Patent: Jun. 14, 2016

(54) SYSTEM AND METHOD FOR REDUCING LOADS ACTING ON A WIND TURBINE IN RESPONSE TO TRANSIENT WIND CONDITIONS

(71) Applicant: General Electric Company, Schenectady, NY (US)

(72) Inventors: Thomas Franklin Perley, Simpsonville, SC (US); Brandon Shane Gerber, Charleston, SC (US); Rahul Rastogi, Greenville, SC (US)

(73) Assignee: General Electric Company, Schenectady, NY (US)

( * ) Notice: Subject to any disclaimer, the term of this patent is extended or adjusted under 35 U.S.C. 154(b) by 562 days.

(21) Appl. No.: 13/803,924

(22) Filed: Mar. 14, 2013

(65) Prior Publication Data

US 2014/0271181 A1 Sep. 18, 2014

(51) Int. Cl.
*F03D 7/04* (2006.01)
*F03D 7/02* (2006.01)
*F03D 7/00* (2006.01)

(52) U.S. Cl.
CPC *F03D 7/042* (2013.01); *F03D 7/00* (2013.01); *F03D 7/024* (2013.01); *F03D 7/0224* (2013.01); *F03D 7/04* (2013.01); *F05B 2260/70* (2013.01); *F05B 2260/80* (2013.01); *F05B 2260/821* (2013.01); *F05B 2260/84* (2013.01); *F05B 2270/335* (2013.01); *Y02E 10/723* (2013.01)

(58) Field of Classification Search
CPC ........... F03D 7/04; F03D 7/042; F03D 7/024; F03D 7/045; F05B 2260/70; F05B 2260/821; F05B 2260/84

See application file for complete search history.

(56) References Cited

U.S. PATENT DOCUMENTS

| | | | |
|---|---|---|---|
| 4,692,095 A | 9/1987 | Lawson-Tancred | |
| 7,522,976 B2 | 4/2009 | Stommel | |
| 1,690,378 A1 | 7/2009 | Menke | |
| 2,840,016 A1 | 11/2009 | Van Dam et al. | |
| 3,110,097 A1 | 12/2009 | Pierce et al. | |
| 7,704,043 B2 | 4/2010 | Kabatzke et al. | |
| 1,330,814 A1 | 6/2010 | Schulten | |
| 1,430,121 A1 | 6/2010 | Haans et al. | |
| 1,803,440 A1 | 6/2010 | Von Mutius et al. | |
| 7,898,100 B2 | 3/2011 | Andersen et al. | |
| 3,030,040 A1 | 2/2013 | Bowyer et al. | |
| 2006/0033338 A1* | 2/2006 | Wilson | F03D 1/0608 290/44 |
| 2006/0140761 A1* | 6/2006 | LeMieux | F03D 7/042 416/61 |
| 2010/0074749 A1* | 3/2010 | Garrido | F03D 7/0296 416/31 |
| 2010/0148507 A1* | 6/2010 | Lim | F03D 7/0296 290/44 |
| 2010/0226772 A1* | 9/2010 | Deering | F03D 7/0204 416/1 |
| 2011/0285129 A1* | 11/2011 | Li | F03D 1/06 290/44 |

FOREIGN PATENT DOCUMENTS

WO 2012/152280 A1 11/2012

\* cited by examiner

*Primary Examiner* — Bryan Lettman
*Assistant Examiner* — Timothy P Solak
(74) *Attorney, Agent, or Firm* — Dority & Manning, P.A.

(57) ABSTRACT

A method for reducing loads acting on a wind turbine in response to transient wind conditions may generally include determining an actual value for a blade parameter of a rotor blade of the wind turbine using a first sensor associated with the rotor blade, monitoring a secondary operating parameter of the wind turbine using a second sensor, determining a predicted value for the blade parameter based on the secondary operating parameter, comparing the actual value to the predicted value and performing a corrective action to reduce the loads acting on the wind turbine if the actual value differs from the predicted value by at least a differential threshold.

18 Claims, 6 Drawing Sheets

SYSTEM AND METHOD FOR REDUCING LOADS ACTING ON A WIND TURBINE IN RESPONSE TO TRANSIENT WIND CONDITIONS

FIELD OF THE INVENTION

The present subject matter relates generally to wind turbines and, more particularly, to systems and methods for reducing the loads on wind turbine components in response to transient wind conditions.

BACKGROUND OF THE INVENTION

Generally, a wind turbine includes a tower, a nacelle mounted on the tower, and a rotor coupled to the nacelle. The rotor typically includes a rotatable hub and a plurality of rotor blades coupled to and extending outwardly from the hub. Each rotor blade may be spaced about the hub so as to facilitate rotating the rotor to enable kinetic energy to be transferred from the wind into usable mechanical energy, and subsequently, electrical energy.

Transient wind conditions often present challenges for implementing control strategies to maintain the loads acting on wind turbine rotor blades and other wind turbine components at relatively low levels. For example, during extreme wind gusts, the wind speed may increase significantly in a relatively short period of time, leading to a rapid increase in blade loading. This rapid increase initially impacts the outboard portions of the rotor blades (e.g., at the tip) where the blades are more susceptible to increased deflection due to loading, which can result in an increased risk of a tower strike due to excessive tip deflection.

Current control strategies identify transient wind conditions by detecting changes in the rotational speed of the generator. However, due to rotor inertia, changes in generator speed lag behind changes in blade loading. As a result, current control strategies may not be sufficiently responsive in reducing blade loading during extreme transient events.

Accordingly, a system and method for reducing the loads on rotor blades and/or other wind turbine components with improved responsiveness to transient wind conditions would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a method for reducing loads acting on a wind turbine in response to transient wind conditions. The method may generally include determining an actual value for a blade parameter of a rotor blade of the wind turbine using a first sensor associated with the rotor blade, monitoring a secondary operating parameter of the wind turbine using a second sensor, determining a predicted value for the blade parameter based on the secondary operating parameter, comparing the actual value to the predicted value and performing a corrective action to reduce the loads acting on the wind turbine if the actual value differs from the predicted value by at least a differential threshold.

In another aspect, the present subject matter is directed to a method for reducing loads acting on a wind turbine in response to transient wind conditions. The method may generally include determining an actual blade deflection value for a rotor blade of the wind turbine using a Micro Inertial Measurement Unit (MIMU) sensor associated with the rotor blade, monitoring a secondary operating parameter of the wind turbine using a second sensor, determining a predicted blade deflection value based on the secondary operating parameter, comparing the actual blade deflection value to the reference blade deflection value and performing a corrective action to reduce the loads acting on the wind turbine if the actual blade deflection value differs from the reference blade deflection value by at least a differential threshold.

In a further aspect, the present subject matter is directed to a system for reducing loads acting on a wind turbine in response to transient wind conditions. The system may include a first sensor configured to monitor a blade parameter of a rotor blade of the wind turbine and a second sensor configured to monitor a secondary operating parameter of the wind turbine. The secondary operating parameter may differ from the blade parameter. In addition, the system may include a controller communicatively coupled to the first and second sensors. The controller may be configured to determine an actual value for the blade parameter based on at least one signal received from the first sensor and a predicted value for the blade parameter based on at least one signal received from the second sensor. The controller may also be configured to compare the actual and predicted values and, in the event that the actual value differs from the predicted value by at least a differential threshold, perform a corrective action to reduce the loads acting on the wind turbine.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system and method for reducing the loads acting on rotor blades and/or other wind turbine components in response to transient wind conditions. Specifically, one or more blade sensors may be used to detect a blade parameter of one or more of the rotor blades. For example, in several embodiments, one or more Micro Inertial Measurement Units (MIMUs) may be used to detect blade loading and/or blade deflection of one or more of the rotor blades. Such detected blade parameters may then be compared to corresponding predicted blade parameters to identify when transient wind conditions exist. For example, if the detected or actual blade parameters deviate from the predicted blade parameters by a significant amount, it may be an indication that a wind gust or other transient event is occurring. A suitable corrective action may then be performed (e.g., by de-rating the wind turbine) to reduce the amount of loads acting on the wind turbine components.

It should be appreciated that, by monitoring one or more blade parameters directly using the blade sensor(s), the disclosed system and method may be capable of detecting the occurrence of transient wind conditions much faster than conventional control systems/methods that rely on the detection of generator speed changes. Thus, corrective actions may be initiated much quicker to ensure that the loads acting on the rotor blades do not become excessive due to extreme transient conditions (e.g., extreme wind gusts).

Figure 1:
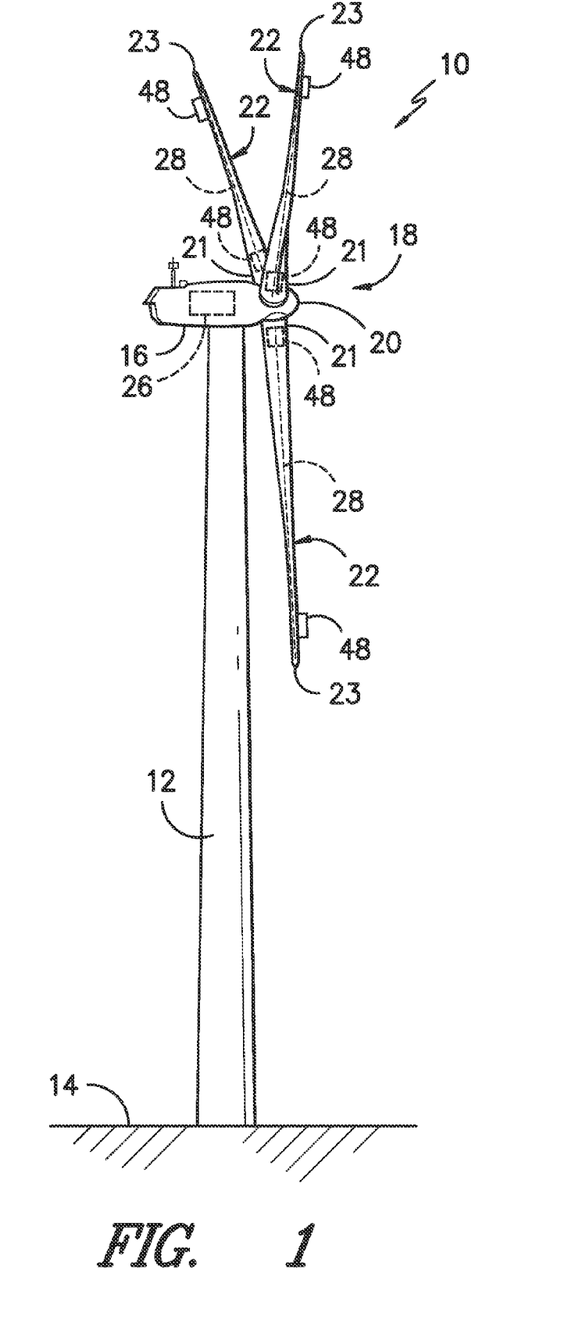
FIG. 1 illustrates a perspective view of one embodiment of a wind turbine.

Referring now to the drawings, FIG. 1 illustrates a perspective view of one embodiment of a wind turbine 10. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

The wind turbine 10 may also include a turbine control system or turbine controller 26 centralized within the nacelle 16. In general, the controller 26 may comprise a computer or other suitable processing unit. Thus, in several embodiments, the controller 26 may include suitable computer-readable instructions that, when implemented, configure the controller 26 to perform various different functions, such as receiving, transmitting and/or executing wind turbine control signals. As such, the controller 26 may generally be configured to control the various operating modes (e.g., start-up or shut-down sequences) and/or components of the wind turbine 10. For example, the controller 26 may be configured to adjust the blade pitch or pitch angle of each rotor blade 22 (i.e., an angle that determines a perspective of the blade 22 with respect to the direction of the wind) about its pitch axis 28 in order to control the rotational speed of the rotor blade 22 and/or the power output generated by the wind turbine 10. For instance, the controller 26 may control the pitch angle of the rotor blades 22, either individually or simultaneously, by transmitting suitable control signals directly or indirectly (e.g., via a pitch controller (not shown)) to one or more pitch adjustment mechanisms 32 (FIG. 2) of the wind turbine 10. During operation of the wind turbine 10, the controller 26 may generally control each pitch adjustment mechanism 32 in order to alter the pitch angle of each rotor blade 22 between 0 degrees (i.e., a power position of the rotor blade 22) and 90 degrees (i.e., a feathered position of the rotor blade 22).

Figure 2:
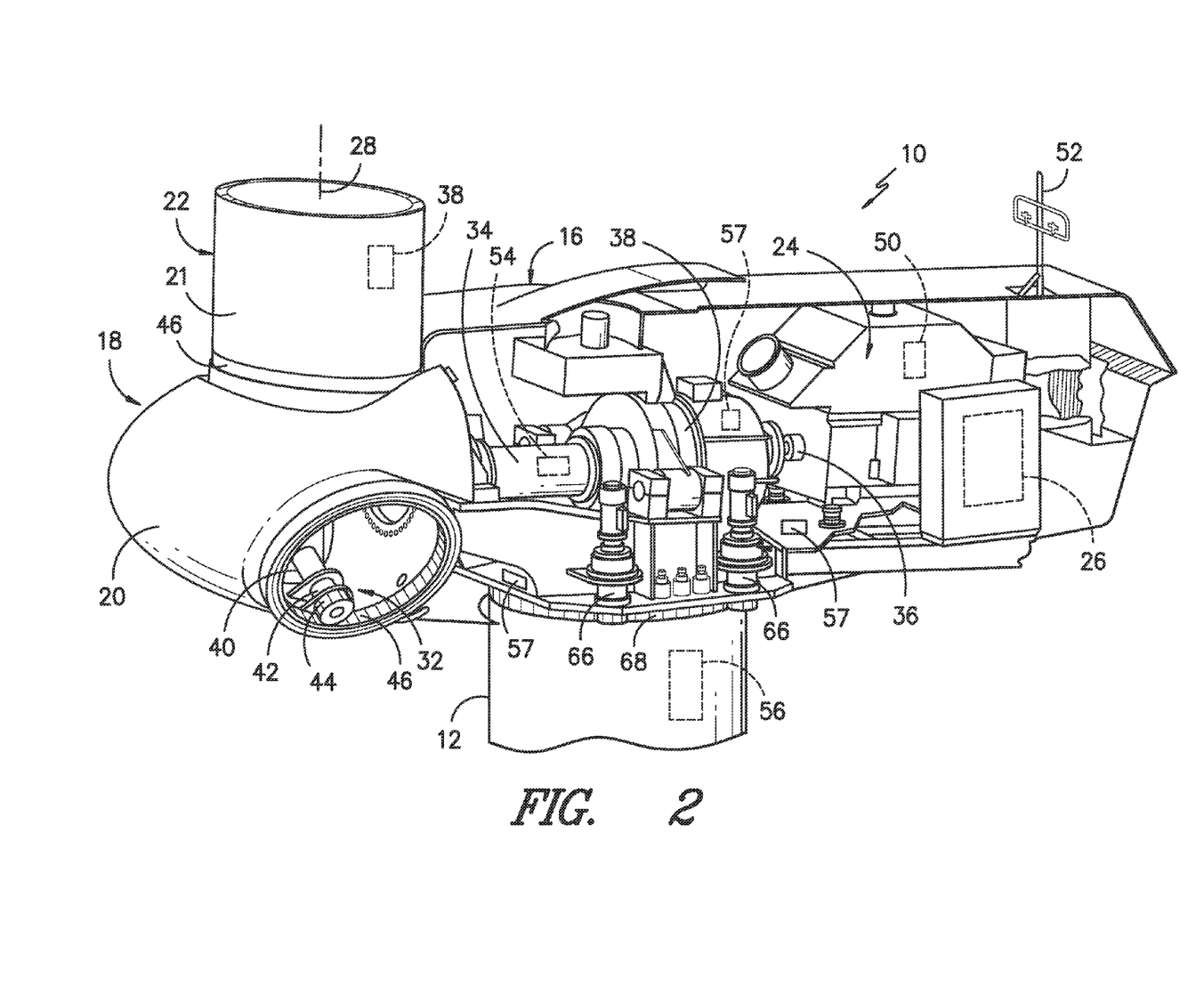
FIG. 2 illustrates a simplified, internal view of one embodiment of a nacelle of a wind turbine.

Referring now to FIG. 2, a simplified, internal view of one embodiment of the nacelle 16 of the wind turbine 10 shown in FIG. 1 is illustrated. As shown, a generator 24 may be disposed within the nacelle 16. In general, the generator 24 may be coupled to the rotor 18 for producing electrical power from the rotational energy generated by the rotor 18. For example, as shown in the illustrated embodiment, the rotor 18 may include a rotor shaft 34 coupled to the hub 20 for rotation therewith. The rotor shaft 34 may, in turn, be rotatably coupled to a generator shaft 36 of the generator 24 through a gearbox 38. As is generally understood, the rotor shaft 34 may provide a low speed, high torque input to the gearbox 38 in response to rotation of the rotor blades 22 and the hub 20. The gearbox 38 may then be configured to convert the low speed, high torque input to a high speed, low torque output to drive the generator shaft 36 and, thus, the generator 24.

Additionally, the controller 26 may also be located within the nacelle 16. However, in other embodiments, the controller 26 may be located within any other component of the wind turbine 10 or at a location outside the wind turbine (e.g., when the controller 26 is configured as a farm controller for controlling a plurality of wind turbines). As is generally understood, the controller 26 may be communicatively coupled to any number of the components of the wind turbine 10 in order to control the operation of such components. For example, as indicated above, the controller 26 may be communicatively coupled to each pitch adjustment mechanism 32 of the wind turbine 10 (one for each rotor blade 22) via a pitch controller to facilitate rotation of each rotor blade 22 about its pitch axis 28.

In general, each pitch adjustment mechanism 32 may include any suitable components and may have any suitable configuration that allows the pitch adjustment mechanism 32 to function as described herein. For example, in several embodiments, each pitch adjustment mechanism 32 may include a pitch drive motor 40 (e.g., any suitable electric motor), a pitch drive gearbox 42, and a pitch drive pinion 44. In such embodiments, the pitch drive motor 40 may be coupled to the pitch drive gearbox 42 so that the pitch drive motor 40 imparts mechanical force to the pitch drive gearbox 42. Similarly, the pitch drive gearbox 42 may be coupled to the pitch drive pinion 44 for rotation therewith. The pitch drive pinion 44 may, in turn, be in rotational engagement with a pitch bearing 46 coupled between the hub 20 and a corresponding rotor blade 22 such that rotation of the pitch drive pinion 44 causes rotation of the pitch bearing 46. Thus, in such embodiments, rotation of the pitch drive motor 40 drives the pitch drive gearbox 42 and the pitch drive pinion 44, thereby rotating the pitch bearing 46 and the rotor blade 22 about the pitch axis 28.

In alternative embodiments, it should be appreciated that each pitch adjustment mechanism 32 may have any other suitable configuration that facilitates rotation of a rotor blade 22 about its pitch axis 28. For instance, pitch adjustment mechanisms 32 are known that include a hydraulic or pneumatic driven device (e.g., a hydraulic or pneumatic cylinder)

configured to transmit rotational energy to the pitch bearing 46, thereby causing the rotor blade 22 to rotate about its pitch axis 28. Thus, in several embodiments, instead of the electric pitch drive motor 40 described above, each pitch adjustment mechanism 32 may include a hydraulic or pneumatic driven device that utilizes fluid pressure to apply torque to the pitch bearing 46.

In addition, the wind turbine 10 may also include one or more sensors for monitoring various operating parameters of the wind turbine 10. For example, in several embodiments, the wind turbine 10 may include one or more blade sensors 48 configured to monitor a blade parameter of the wind turbine 10. As used herein, the term "blade parameter" may refer to any suitable operating condition and/or parameter that relates to one or more of the rotor blades 22 of the wind turbine 10. For instance, blade parameters may include, but are not limited to, blade deflection, blade loading, blade orientation (e.g., blade twisting and/or rotation due to deflection), pitch angle, blade rotational speed, blade vibrations and/or the like. In addition, blade parameters may also include derivatives of any monitored blade parameters (e.g., blade velocity, acceleration, etc.)

In several embodiments, each blade sensor 48 may be a Micro Inertial Measurement Unit (MIMU). As is generally understood, MIMUs may include any combination of three-dimensional (3-D) accelerometers, 3-D gyroscopes and 3-D magnetometers and thus, when mounted on and/or within a rotor blade 22, may be capable of providing various types of blade-related measurements, such as 3-D blade orientation (pitch, roll, yaw) measurements, 3D blade acceleration measurements, 3-D rate of turn measurements, 3D magnetic field measurements and/or the like. As will be described below, such measurements may then be transmitted to the controller 26 and subsequently analyzed to determine real-time values for one or more of the blade parameters.

In alternative embodiments, the blade sensors 48 may be any other suitable sensors capable of monitoring a blade parameter of one or more of the rotor blades 22. For example, the blade sensors 48 may be strain gauges, accelerometers, pressure sensors, angle of attack sensors, vibration sensors, LIDAR sensors, camera systems, fiber optic systems, other optical sensors and/or any other suitable sensors.

As shown in FIG. 1, in one embodiment, multiple blade sensors 48 may be associated with each rotor blade 22. In such an embodiment, the blade sensors 48 may generally be disposed at any suitable location along the length of the rotor blades 22. For example, as shown in FIG. 1, one blade sensor 48 may be located generally adjacent to a root 21 of each rotor blade 22 while another blade sensor 48 may be located generally adjacent to a tip 23 of each rotor blade 22. However, it should be appreciated that, in alternative embodiments, a single blade sensor 48 may be associated with each rotor blade 22 or a blade sensor(s) 48 may be associated with less than all of the rotor blades 22. It should also be appreciated that the blade sensors 48 may be configured to be mounted along the exterior of the rotor blade(s) 22 and/or along the interior of the rotor blade(s) 22 (including being embedded within a wall of the rotor blade(s) 22).

Additionally, it should be appreciated that the wind turbine 10 may also include various other sensors for monitoring other operating parameters of the wind turbine 10. For example, as shown in FIG. 2, the wind turbine 10 may include one or more generator sensors 50 for monitoring the torque, the rotational speed, the acceleration and/or the power output of the generator 24. Similarly, the wind turbine 10 may include one or more wind sensors 52 for monitoring the wind speed and/or one or more shaft sensors 54 for measuring the loads acting on the rotor shaft 34 and/or the rotational speed of the rotor shaft 34. Additionally, the wind turbine 10 may include one or more towers sensors 56 for measuring the loads transmitted through the tower 12 and/or the acceleration of the tower 12. Of course, the wind turbine 10 may further include various other suitable sensors for measuring any other suitable operating parameters of the wind turbine 10. For example, the wind turbine 10 may also include one or more sensors 57 (e.g., accelerometers) for monitoring the acceleration of the gearbox 38 and/or the acceleration of one or more structural components of the machine head (e.g., the generator frame, the main frame or bedplate, etc.).

It should be appreciated that, as used herein, the term "monitor" and variations thereof indicates that the various sensors of the wind turbine may be configured to provide a direct measurement of the parameters being monitored or an indirect measurement of such parameters. Thus, the sensors may, for example, be used to generate signals relating to the parameter being monitored, which can then be utilized by the controller 26 to determine the actual parameter. For instance, as indicated above, MIMU sensors may be used to monitor one or more blade parameters by providing various 3-D measurements, which may then be correlated to the blade parameter(s).

Figure 3:
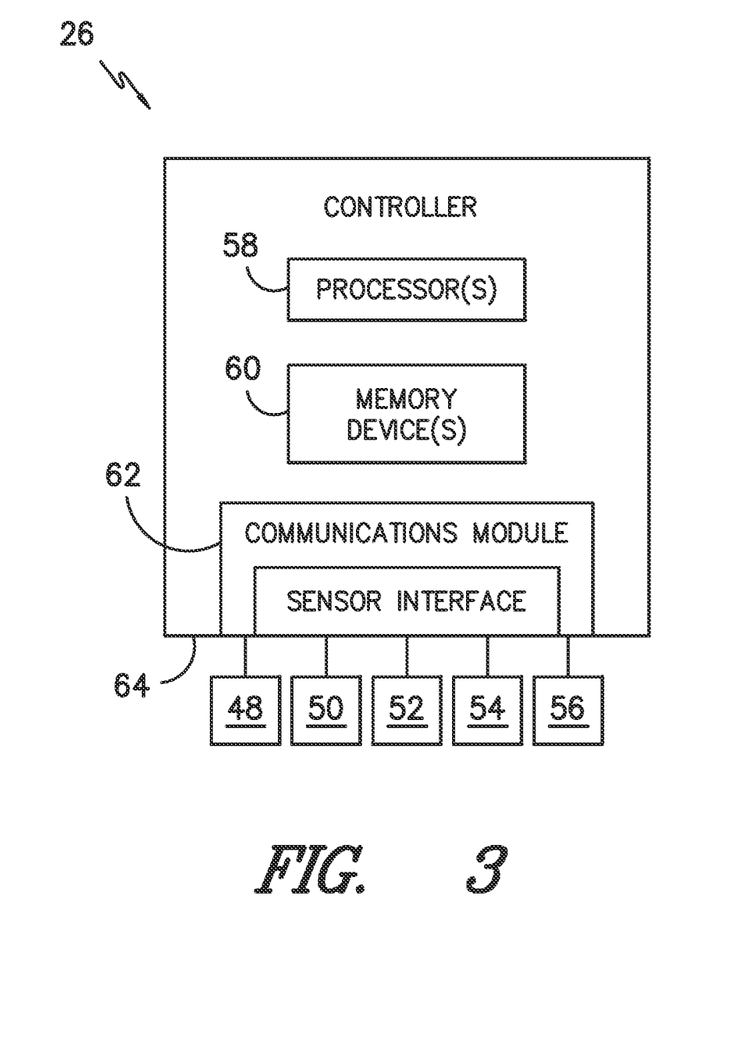
FIG. 3 illustrates a schematic diagram of one embodiment of suitable components that may be included within a controller of a wind turbine.

Referring now to FIG. 3, there is illustrated a block diagram of one embodiment of suitable components that may be included within the controller 26 in accordance with aspects of the present subject matter. As shown, the controller 26 may include one or more processor(s) 58 and associated memory device(s) 60 configured to perform a variety of computer-implemented functions (e.g., performing the methods, steps, calculations and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 60 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 60 may generally be configured to store suitable computer-readable instructions that, when implemented by the processor(s) 58, configure the controller 26 to perform various functions including, but not limited to, determining one or more operating parameters of the wind turbine 10 based on sensor measurements, transmitting suitable control signals to implement corrective actions in response to the detection of transient wind conditions and various other suitable computer-implemented functions.

Additionally, the controller 26 may also include a communications module 62 to facilitate communications between the controller 26 and the various components of the wind turbine 10. For instance, the communications module 62 may serve as an interface to permit the turbine controller 26 to transmit control signals to each pitch adjustment mechanism 32 for controlling the pitch angle of the rotor blades 22. Moreover, the communications module 62 may include a sensor interface 64 (e.g., one or more analog-to-digital converters) to permit signals transmitted from the sensors 48, 50, 52, 54, 56 to be converted into signals that can be understood and processed by the processors 58.

It should be appreciated that the sensors 48, 50, 52, 54, 56 may be communicatively coupled to the communications module 62 using any suitable means. For example, as shown in FIG. 3, the sensors 48, 50, 52, 54, 56 are coupled to the sensor interface 64 via a wired connection. However, in other embodiments, the sensors 48, 50, 52, 54, 56 may be coupled to the sensor interface 64 via a wireless connection, such as by using any suitable wireless communications protocol known in the art.

Figure 4:
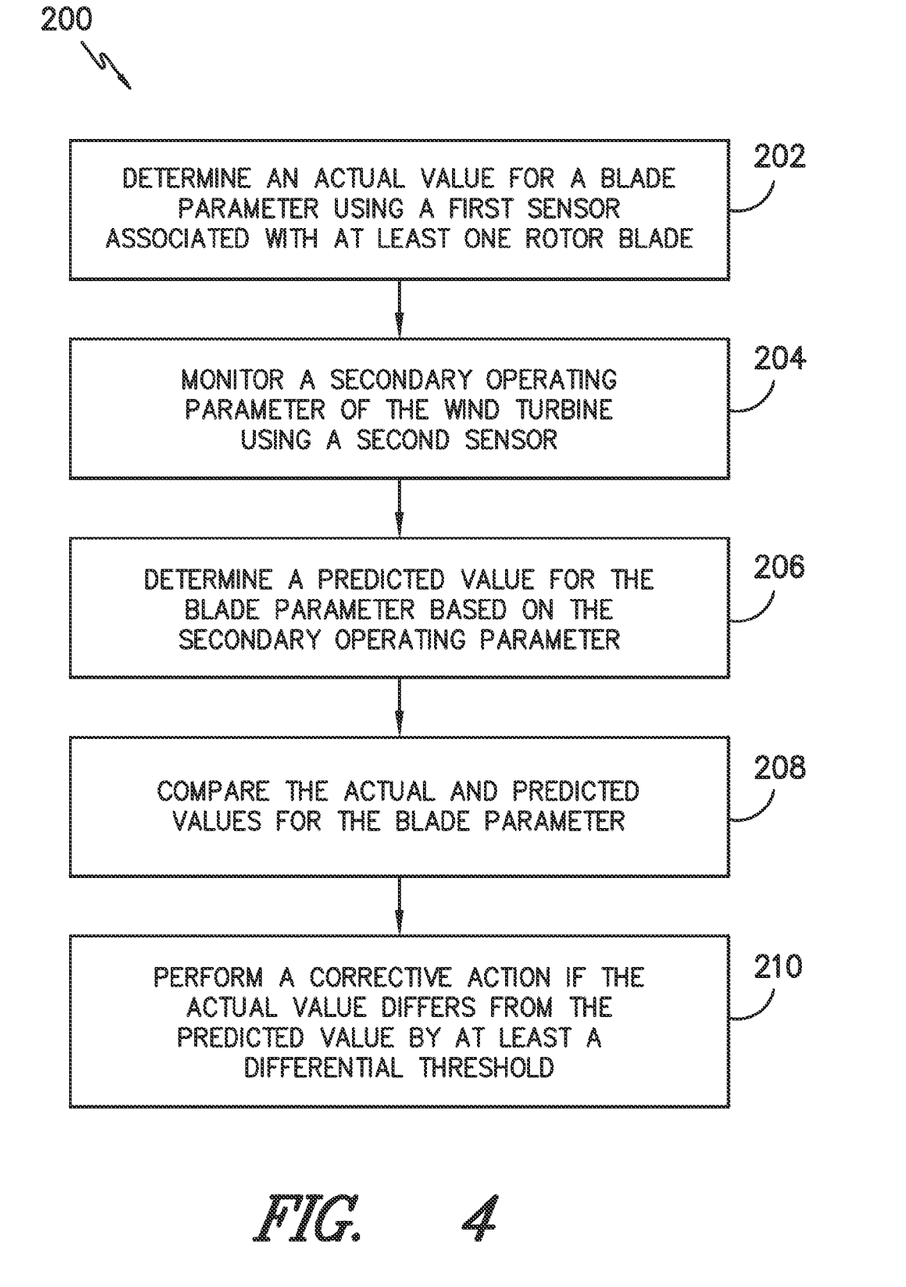
FIG. 4 illustrates a flow diagram of one embodiment of a method for reducing loads acting on a wind turbine rotor blade in response to transient wind conditions.

Referring now to FIG. 4, a flow diagram of one embodiment of a method 200 for reducing the loads acting on a wind turbine in response to transient wind conditions is illustrated in accordance with aspects of the present subject matter. As shown, the method 200 may include determining an actual value for a blade parameter with a first sensor associated with at least one of the rotor blades 202, monitoring a secondary operating parameter of the wind turbine using a second sensor 204, determining a predicted value for the blade parameter based on the secondary operating parameter 206, comparing the actual value to the predicted value 208 and performing a corrective action to reduce the loads acting on the wind turbine when the actual value differs from the predicted value by at least a differential threshold 210.

In general, the disclosed method 200 may be utilized to reduce wind turbine component loading (e.g., blade loads, tower loads, machine head loads, etc.) in the response to transient wind conditions, such as extreme wind gusts. Specifically, one or more blade parameters, such as blade loading and/or blade deflection, may be monitored using one or more suitable sensors to acquire real-time data relating to the actual operating state of the rotor blades 22. In addition, data relating to the predicted operating state of the rotor blades 22 may be obtained by monitoring one or more other operating parameters of the wind turbine 10 and subsequently correlating the operating parameter(s) to predicted values for the blade parameter(s). Thereafter, the real-time data for the blade parameter(s) (i.e., the actual, monitored values) may be compared to the predicted data for the blade parameter(s) (i.e., the predicted values) in order to identify when a transient wind condition exists. For example, if the real-time data differs from the predicted data substantially, it may be determined that the wind turbine 10 is currently experiencing transient wind conditions. In such instance, a suitable corrective action may be performed to reduce the loads acting on the rotor blades 22 and/or other wind turbine components, thereby alleviating the effect of the transient event.

Referring particularly to FIG. 4, at 202, an actual value for a blade parameter may be monitored using a sensor associated with at least one of the rotor blades 22. Specifically, as indicated above, one or more blade sensors 48 may be associated with the rotor blades 22 for monitoring various blade parameters. For example, one or more MIMU sensors may be used to allow 3-D blade orientation (pitch, roll, yaw) measurements, 3-D blade acceleration measurements, 3-D rate of turn measurements and/or 3-D magnetic field measurements to be acquired. These measurements may then be transmitted to the controller 26 and subsequently analyzed to determine real-time, monitored values for one or more of the blade parameters.

In general, the controller 26 may be configured to implement any suitable algorithm that allows for the determination of actual, monitored values for the blade parameter(s) based on the outputs provided by the blade sensor(s) 48. In several embodiments, the controller 26 may be configured to implement a model-based estimation algorithm. For example, the mathematical model used to determine the actual values for the blade parameter(s) may be physics-based, such as a model based on static mechanics and/or aerodynamic factors. In another embodiment, the mathematical model may be data-driven and may be based on experimental data from the wind turbine 10, such as by using an artificial neural network to determine the wind turbine parameters. Alternatively, the mathematical model may be a combination of both physics-based and data-driven models. Regardless, the mathematical model may be used as a transfer function in order to derive actual values for the blade parameter(s) based on the outputs received from the blade sensor(s) 48.

In particular embodiments of the present subject matter, a simplified or complex mathematical model of each rotor blade 22 may be stored within the controller 26 (e.g., in the form of computer-readable instructions) to allow the controller 26 to estimate and/or determine actual values for one or more of the blade parameters of the wind turbine 10. For example, in one embodiment, a 3D or finite element mathematical model of each rotor blade 22 may be created using suitable modeling software and stored within the controller 26. In such an embodiment, the measurements provided by the blade sensors 38 may be analyzed using the mathematical model in order to determine actual values for the blade parameter(s).

In alternative embodiments, the controller 26 may be configured to determine actual values for the blade parameter(s) using any other suitable means/methodology. For example, instead of calculating the actual values using a model-based algorithm, the controller 26 may simply be configured to utilize look-up tables, charts, data maps and/or any other suitable data compilations to determine the actual values based on the signals provided by the blade sensor(s) 48.

Referring still to FIG. 4, at 204 and 206, one or more secondary operating parameters of the wind turbine 10 may be monitored and subsequently analyzed by the controller 26 to determine predicted values for one or more of the blade parameters As used herein, the term "secondary operating parameter" may generally refer to any suitable operating parameter of the wind turbine 10, such as one or more blade parameters (e.g., blade deflection, blade loading, blade twisting, pitch angle, blade rotational speed blade vibrations and/or the like) or one or more non-blade operating parameters (e.g., generator torque, generator speed, power output, shaft loads, tower loads, rotor speed, component vibrations, component accelerations (e.g., tower acceleration, machine head acceleration, gearbox acceleration), yaw angle, wind speed and/or the like). As indicated above, such operating parameters may be monitored using various sensors (e.g., sensors 48, 50, 52, 54, 56) provided on and/or within the wind turbine 10.

In several embodiments, the secondary operating parameter(s) being monitored at 204 may differ from the blade parameter(s) being monitored at 202. For example, in a particular embodiment, when the blade sensors 48 are being utilized to monitor blade loading and/or blade deflection, the secondary operating parameter(s) may correspond to one or a combination of various other operating parameters, such as a combination of pitch angle and one or more of generator speed, generator torque and power output. As such, the predicted values for the blade parameter may be determined by the controller 26 without reference to the actual, monitored values provided by the blade sensors 48.

It should be appreciated that controller 26 may be configured to implement any suitable algorithm that permits for the predicted values to be determined using the secondary operating parameter(s) as inputs. For instance, in several embodiments, the controller 26 may be configured to implement a model-based estimation algorithm. In such embodiments, the mathematical model may be physics-based, data-driven or a combination of both physics-based and data-driven models.

Regardless, the mathematical model may be used as a transfer function in order to derive the predicted values for the blade parameter(s) based on the secondary operating parameter(s).

In several embodiments, a simplified or complex mathematical model of the wind turbine 10 may be stored within the controller 26 (e.g., in the form of computer-readable instructions) to allow the controller 26 to estimate and/or determine predicted values for one or more of the blade parameters. For example, in one embodiment, a 3D or finite element mathematical model of the wind turbine may be created using suitable modeling software and stored within the controller 26. In such an embodiment, the monitored secondary operating parameter(s) may be input into the mathematical model in order to determine the predicted values for the blade parameter(s).

In alternative embodiments, the controller 26 may be configured to determine predicted values for the blade parameter(s) using any other suitable means/methodology. For example, instead of calculating the predicted values using a model-based algorithm, the controller 26 may simply be configured to utilize look-up tables, charts, data maps and/or any other suitable data compilations to determine the predicted values based on the monitored secondary operating parameter(s).

After determining the predicted values, at 208, the actual and predicted values for the blade parameter(s) may be compared. Specifically, for each actual value determined by the controller 26, a corresponding predicted value may also be determined. Thereafter, each actual value may be compared to its corresponding predicted value to determine the error or differential between the two values. If the actual value differs from the predicted value by a given differential threshold, it may be determined that a transient wind condition exists. As will be described below, a suitable corrective action may then be performed to reduce loading on the rotor blades 22 and/or other wind turbine components to alleviate the effect of the transient event.

Figure 6:
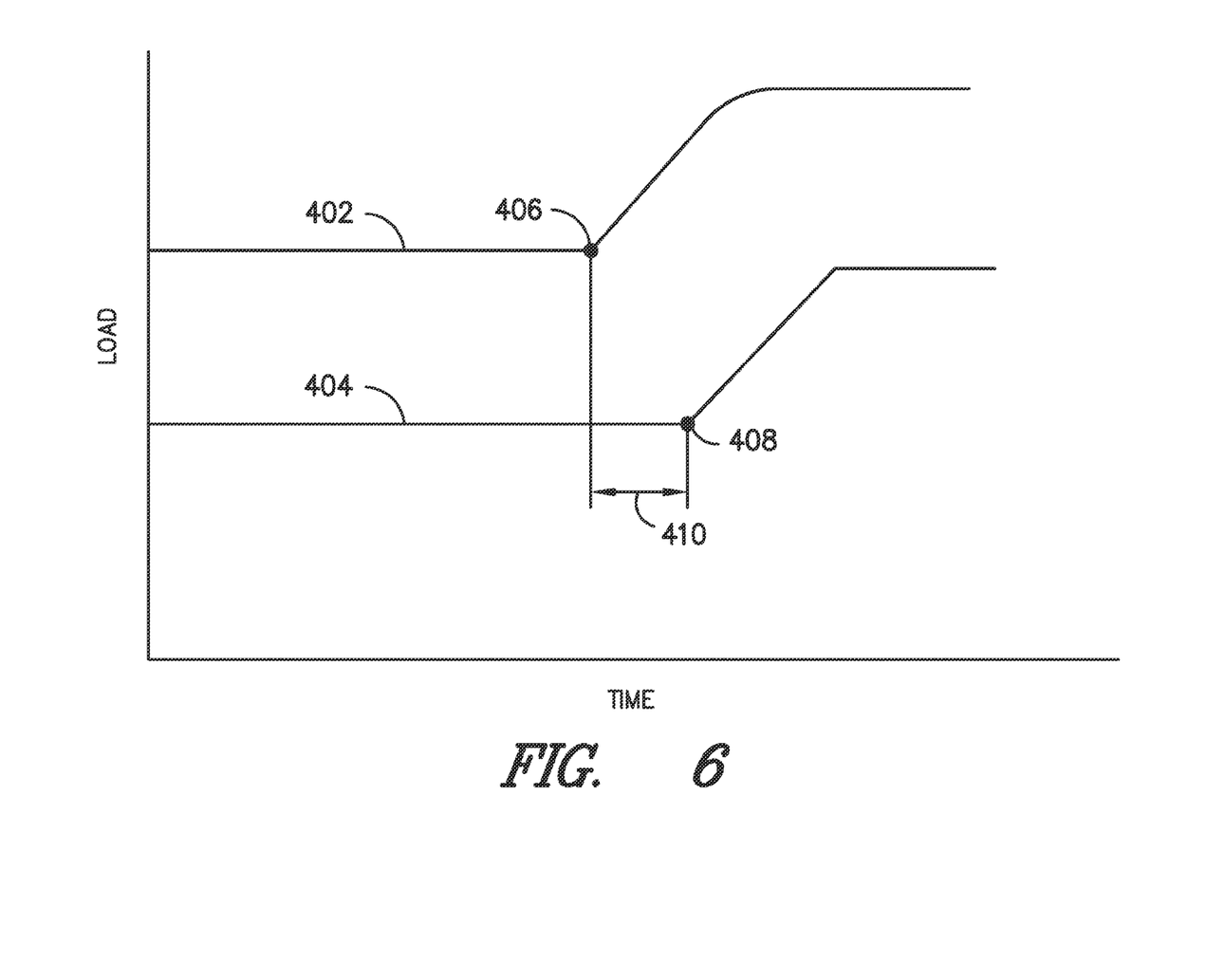
FIG. 6 illustrates a graph charting example loading data for a rotor blade and a rotor shaft of the wind turbine, particularly illustrating the time differential between changes in the blade loading and changes in the shaft loading.

As indicated above, the actual value for the blade parameter(s) may differ from the predicted value at any given instant due, at least in part, to rotor inertia and/or any other operational factors that result in a time lag between changes in blade loading and changes in the loading of the other wind turbine components. For example, FIG. 6 illustrates a simplified representation of the loads acting on a rotor blade 22 (line 402) and a rotor shaft 34 (line 404) of the wind turbine 10 as a function of time. As shown, at point 406, a loading event (e.g., wind gust) has occurred that causes the loads acting on the rotor blade 22 to immediately increase. However, due to rotor inertia and/or other operational factors, the shaft loading may not begin to increase until a later time (e.g., at point 408), thereby creating a time differential 410 in the loading response between the rotor blade 22 and the rotor shaft 34. As such, in an embodiment in which the predicted value for the blade parameter(s) is based on the loads acting on the rotor shaft 34, the actual value for the blade parameter(s) may differ substantially from the predicted value, at the very least, over the time period defined by time differential 410. Accordingly, the difference between the actual and predicted values may be used to identify the occurrence of certain loading events on the wind turbine 10. It should be appreciated that, although line 404 in FIG. 6 has been described with reference to shaft loading, the line may be representative of the loads acting on any other suitable wind turbine component in which a time lag exists between changes in blade loading and changes in the loading for such component.

It should be appreciated that the differential threshold may generally correspond to any suitable variation amount between the actual and predicted values for a specific blade parameter that may serve as a trigger point for initiating a corrective action. For example, in several embodiments, the differential threshold may be a +/− variation calculated based on the predicted operating state of the rotor blades 22 during normal operation. Specifically, based on data gathered during normal wind turbine operation, an average predicted value may be determined for each blade parameter, which may then be used as the basis for defining the differential threshold. For example, in one embodiment, the differential threshold for a specific blade parameter may be defined as +/− two standard deviations from the average predicted value for such blade parameter during normal wind turbine operation. In another embodiment, the differential threshold for a given blade parameter may correspond to a +/− variation amount ranging from about 50% to about 80% of the average predicted value for the blade parameter during normal wind turbine operation, such as from about 55% to about 75% of the average predicted value, or from about 60% to about 70% of the average predicted value and any other subranges therebetween.

Figure 5:
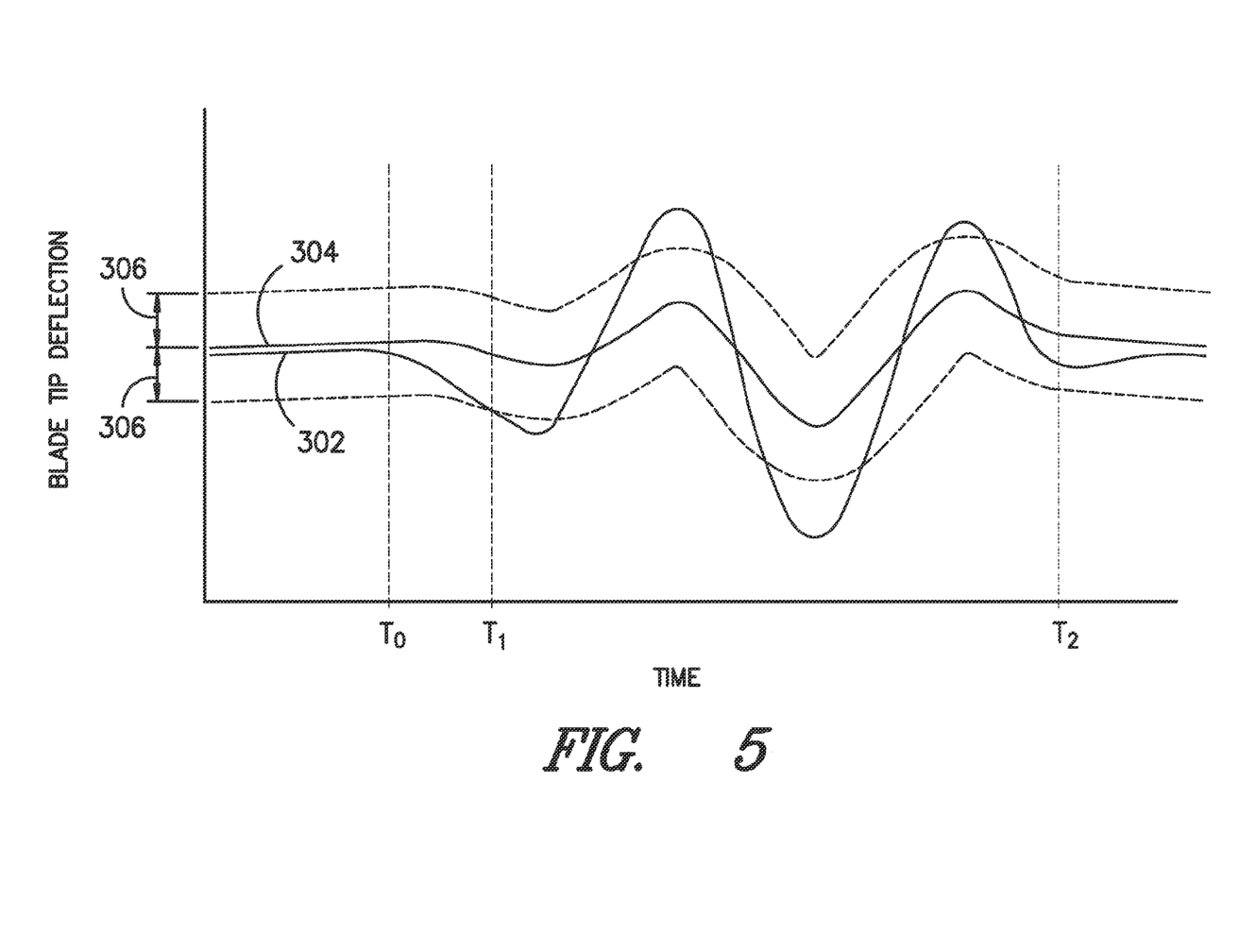
FIG. 5 illustrates a graph charting example tip deflection data including both actual and predicted tip deflection values.

For example, FIG. 5 illustrates a graph depicting example tip deflection data for a rotor blade 22, including both the actual tip deflection values (line 302) determined using the measurements provided by the blade sensors 48 and the predicted tip deflection values (line 304) determined based on the secondary operating parameter(s). The graph also illustrates the differential threshold (indicated as the variation 306 between the dashed lines and line 304) as a predetermined +/− variation from the predicted deflection values 304. As shown, the actual deflection values 302 may be continuously compared to the predicted deflection values 304 to determine if the difference between the values exceeds the differential threshold 306, thereby indicating that a transient wind condition exists. For example, in the illustrated embodiment, a wind gust or other transient event has occurred at time $T_0$, thereby causing the actual deflection values 302 to deviate from the predicted deflection values 304. If the deviation between the actual and predicted deflection values 302, 304 remains within the differential threshold 306, it may be determined that the transient event is not sufficient to cause an excessive increase in blade loading or other component loading. However, if the actual deflection values 302 deviate from the predicted deflection values 304 beyond the differential threshold 306 (e.g., at time $T_1$), it may be determined that the transient event may be sufficient to cause a substantial increase in the loads acting on the wind turbine 10. As such, a corrective action may be performed to reduce or otherwise counteract the resulting component loading. For instance, as shown in FIG. 5, by performing a corrective action between times $T_1$ and $T_2$, the variation between the actual and predicted deflection values 302, 304 may be reduced to an amount within the differential threshold 306.

Referring back to FIG. 4, at 210, a corrective action may be performed to reduce the loads acting on the wind turbine 10 when the actual value differs from the predicted value by at least the differential threshold. In general, the corrective action performed may form all or part of any suitable mitigation strategy designed to reduce or otherwise control blade loading and/or any other suitable wind turbine component loading (e.g., loads acting on the hub 20, nacelle 16 and/or tower 12). For example, in several embodiments, the corrective action may include temporarily de-rating the wind turbine to permit the loads acting on one or more of the wind turbine components to be reduced or otherwise controlled, which may include speed de-rating, torque de-rating or a combination of both. For example, in one embodiment, the wind turbine 10 may be temporally de-rated by pitching one or more of the rotor blades 22 for a partial or full revolution of the rotor 18 to permit the loads acting on the rotor blades 22 and/or other wind turbine components to be reduced or otherwise controlled. As described above, the pitch angle of each rotor blade 22 may be adjusted by controlling its associated pitch adjustment mechanism 32 (FIG. 2).

In another embodiment, the wind turbine 10 may be temporarily de-rated by modifying the torque demand on the generator 23. In general, the torque demand may be modified using any suitable method, process, structure and/or means known in the art. For instance, in one embodiment, the torque demand on the generator 24 may be controlled using the turbine controller 26 by transmitting a suitable control signal/command to the generator 24 in order to modulate the magnetic flux produced within the generator 24. As is generally understood, by modifying the torque demand on the generator 224, the rotational speed of the rotor blades may be reduced, thereby reducing the aerodynamic loads acting on the blades 12 and the reaction loads on various other wind turbine components.

In a further embodiment, the wind turbine 10 may be temporarily de-rated by yawing the nacelle 16 to change the angle of the nacelle 16 relative to the direction of the wind. Specifically, as shown in FIG. 2, the wind turbine 10 may include one or more yaw drive mechanisms 66 communicatively coupled to the controller 26, with each yaw drive mechanism(s) 66 being configured to change the angle of the nacelle 16 relative to the wind (e.g., by engaging a yaw bearing 68 (also referred to as a slewring or tower ring gear) of the wind turbine 10). As is generally understood, the angle of the nacelle 16 may be adjusted such that the rotor blades 22 are properly angled with respect to the prevailing wind, thereby reducing the loads acting on one or more of the wind turbine components. For example, yawing the nacelle 16 such that the leading edge of each rotor blade 22 points upwind may reduce loading on the blades 22 as they pass the tower 12.

In other embodiments, the corrective action may comprise any other suitable control action that may be utilized to reduce the amount of loads acting on one or more of the wind turbine components as a result of transient wind conditions. For example, in embodiments in which a wind turbine 10 includes one or more mechanical brakes (not shown), the controller 26 may be configured to actuate the brake(s) in order to reduce the rotational speed of the rotor blades 22, thereby reducing component loading. In even further embodiments, the loads on the wind turbine components may be reduced by performing a combination of two or more corrective actions, such as by altering the pitch angle of one or more of the rotor blades 22 together with modifying the torque demand on the generator 24.

Additionally, it should be appreciated that the type and/or severity of the corrective action performed may be varied depending upon the magnitude of the difference between the actual and predicted values. For example, if the difference between the actual and predicted values exceeds the differential threshold by an insignificant amount, it may be desirable to de-rate the wind turbine 10 by a relatively small amount (e.g., by an amount less than 10% of the average power output) and/or for a relatively short period of time (e.g., less than 10 seconds). However, if the difference between the actual and predicted values exceeds the differential threshold by a significant amount, it may be desirable to de-rate the wind turbine 10 by a larger percentage (e.g., by an amount greater than 10% of the average power output) and/or for a longer period of time (e.g., greater than 10 seconds) to ensure that the loads acting on one or more of the wind turbine components are sufficiently reduced in response to the transient event.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for reducing loads acting on a wind turbine in response to transient wind conditions, the system comprising:
    a first sensor configured to monitor a blade deflection of a rotor blade of the wind turbine, the blade deflection corresponding to an amount that the rotor blade deflects in response to wind loads acting on the rotor blade;
    a second sensor configured to monitor a secondary operating parameter of the wind turbine, the secondary operating parameter corresponding to a different operating parameter for the wind turbine than the blade deflection of the rotor blade; and
    a controller communicatively coupled to the first and second sensors, the controller being configured to determine an actual blade deflection value for the blade deflection of the rotor blade based on at least one signal received from the first sensor and a predicted blade deflection value for the blade deflection of the rotor blade based on at least one signal received from the second sensor, the controller being further configured to compare the actual blade deflection and predicted blade deflection values and, in the event that the actual blade deflection value differs from the predicted blade deflection value by at least a differential threshold, perform a corrective action to reduce the loads acting on the wind turbine.

2. The system of claim 1, wherein the first sensor comprises a MIMU sensor.

3. The system of claim 1, wherein the secondary operating parameter comprises at least one of pitch angle, generator torque, generator speed, power output, tower load, shaft load, rotor speed, gearbox acceleration, tower acceleration or machine head acceleration.

4. The system of claim 1, wherein the controller is configured to determine the predicted blade deflection value independent of the actual blade deflection value determined for the rotor blade.

5. The system of claim 1, wherein the differential threshold corresponds to a +/− variation amount based on an average predicted value for the blade deflection of the rotor blade.

6. The system of claim 1, wherein the corrective action comprises de-rating the wind turbine.

7. The system of claim 1, wherein the controller is configured to vary at least one of a type or severity of the corrective action performed based on a magnitude of the difference between the actual blade deflection value and the predicted blade deflection value.

8. The system of claim 1, wherein the actual blade deflection value differs from the predicted blade deflection value due to a time differential in a loading response to the wind loads between the rotor blade and a non-blade component of the wind turbine due to the transient wind conditions.

9. A method for reducing loads acting on a wind turbine in response to transient wind conditions, the method comprising:
- determining an actual blade deflection value for a rotor blade of the wind turbine using a first sensor associated with the rotor blade, the actual blade deflection value corresponding to an amount that the rotor blade deflects in response to wind loads acting on the rotor blade;
- monitoring a secondary operating parameter of the wind turbine using a second sensor, the secondary operating parameter corresponding to a different operating parameter for the wind turbine than blade deflection;
- determining a predicted blade deflection value for the rotor blade based on the secondary operating parameter;
- comparing the actual blade deflection value to the predicted blade deflection value; and
- performing a corrective action to reduce the loads acting on the wind turbine if the actual blade deflection value differs from the predicted blade deflection value by at least a differential threshold.

10. The method of claim 9, wherein the first sensor comprises a MIMU sensor associated with the rotor blade.

11. The method of claim 9, wherein the secondary operating parameter comprises at least one of pitch angle, generator torque, generator speed, power output, tower load, shaft load, rotor speed, gearbox acceleration, tower acceleration or machine head acceleration.

12. The method of claim 9, wherein determining a predicted blade deflection value for the rotor blade based on the secondary operating parameter comprises determining the predicted blade deflection value independent of the actual blade deflection value determined for the rotor blade.

13. The method of claim 9, wherein the differential threshold corresponds to a +/− variation amount based on an average predicted value for blade deflection of the rotor blade.

14. The method of claim 9, wherein performing a corrective action to reduce loads acting on the wind turbine if the actual blade deflection value differs from the predicted blade deflection value by at least a differential threshold comprises de-rating the wind turbine when the actual blade deflection value differs from the predicted blade deflection value by at least the differential threshold.

15. The method of claim 14, wherein de-rating the wind turbine comprises at least one of pitching the rotor blade, modifying a torque demand on a generator of the wind turbine or yawing a nacelle of the wind turbine.

16. The method of claim 9, wherein at least one of a type or severity of the corrective action performed is varied depending on a magnitude of the difference between the actual blade deflection value and the predicted blade deflection value.

17. The method of claim 9, wherein the actual blade deflection value differs from the predicted blade deflection value due to a time differential in a loading response between the rotor blade and a non-blade component of the wind turbine due to the transient wind conditions.

18. A method for reducing loads acting on a wind turbine in response to transient wind conditions, the method comprising:
- determining an actual blade deflection value for a rotor blade of the wind turbine using a MIMU sensor associated with the rotor blade, the actual blade deflection value corresponding to an amount that the rotor blade deflects in response to wind loads acting on the rotor blade;
- monitoring a shaft load on a rotor shaft of the wind turbine using a second sensor;
- determining a predicted blade deflection value based on the shaft load;
- determining that a difference exists between the actual blade deflection and the predicted blade deflection value, the difference being associated with a time differential of a loading response to the wind loads between the rotor blade and the rotor shaft due to the transient wind conditions; and
- performing a corrective action to reduce the loads acting on the wind turbine if the difference between the actual blade deflection value and the predicted blade deflection value is greater than as differential threshold.

* * * * *